United States Patent [19]

Heindl

[11] 3,887,170

[45] June 3, 1975

[54] INJECTION UNIT FOR AN INJECTION MOULDING MACHINE

[75] Inventor: Friedrich Heindl, Schwertberg, Austria

[73] Assignee: Ludwig Engel KG, Schwertberg, Austria

[22] Filed: June 7, 1974

[21] Appl. No.: 477,503

[30] Foreign Application Priority Data
June 19, 1973 Austria .................................. 5404/73

[52] U.S. Cl. .................................. 259/191; 425/242
[51] Int. Cl. .................................. B29b 1/06
[58] Field of Search .......... 259/191, 192, 193, 2, 5, 259/6, 97; 425/242, 245; 100/145

[56] References Cited
UNITED STATES PATENTS
| | | | |
|---|---|---|---|
| 3,806,294 | 4/1974 | Hehl | 259/191 |
| 3,822,057 | 7/1974 | Wheeler | 259/191 |
| 3,822,867 | 7/1974 | Evans | 259/191 |
| 3,825,235 | 7/1974 | Schwertfeger | 259/191 |

*Primary Examiner*—Robert W. Jenkins
*Attorney, Agent, or Firm*—Wenderoth, Lind & Ponack

[57] ABSTRACT

An injection unit for an injection moulding machine, in particular for processing thermoplastic materials, has a rotatable screw which is disposed in an axially displaceable material cylinder and which is axially displaceable relative to the cylinder. Both the cylinder and the screw are movable by their own respective hydraulic cylinders. The cylinder is fixedly connected to bar members which are displaceable by hydraulically actuated pistons. Each bar member carries a further piston which is slidable in a cylinder which is connected to the screw or the actuating means thereof.

3 Claims, 1 Drawing Figure

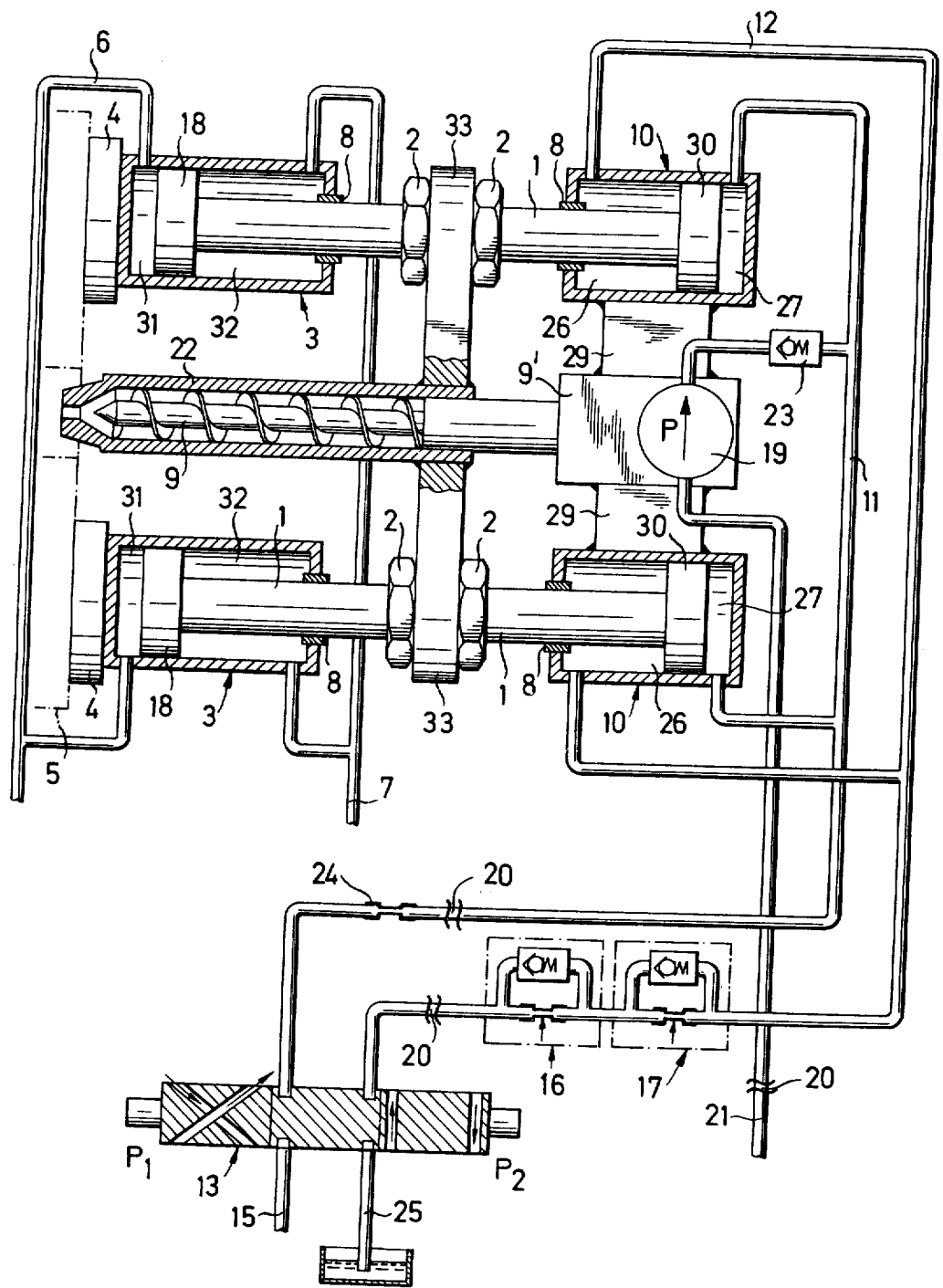

INJECTION UNIT FOR AN INJECTION MOULDING MACHINE

BACKGROUND OF THE INVENTION

This invention relates to an injection unit for an injection moulding machine, in particular for processing thermoplastic materials, having a rotatable screw which is disposed in an axially displaceable material cylinder and which is axially displaceable relative to such cylinder, wherein both the cylinder and the screw are movable by their own respective hydraulic cylinders.

Injection units of this kind generally have two bar members which serve as guides for the material cylinder and which are connected at their ends to the machine frame. Each of the bars carries a piston which is slidable in a cylinder block connected to the material cylinder. In addition, the material cylinder is connected to a cylinder block in which there slides a piston which can be acted upon on one face and which is provided with a hollow guide bar. The drive shaft for the screw extends axially through the piston, and the piston urges the screw into the material cylinder by way of a pressure bearing, when fluid pressure is applied to the piston.

A construction of this nature however causes the apparatus to be of substantial structural length and therefore requires a relatively large amount of space, due to the guide means necessary for the actuating piston for actuating the screw.

SUMMARY OF THE INVENTION

The invention is based on the problem of proposing an injection unit which is distinguished by a very short structural length and with which operation can be both in a vertical and in a horizontal position.

In accordance with the invention, this is achieved in that the material cylinder is fixedly connected to bar members which are displaceable by hydraulically actuated pistons, wherein each bar member carries a further piston slidable in a cylinder which is connected to the screw or the actuating means thereof.

This mode of construction makes it unnecessary to provide a guide means for the pistons actuating the screw, as the bar members can take over this function, so that the structural length is correspondingly reduced. In addition it is possible for the cylinders in which the pistons for actuating the bar members slide, to be flanged onto the mould carrier plate horizontally or vertically. This makes it possible for the injection unit to be brought relatively quickly into the particular operating position which is the more favourable in each case.

BRIEF DESCRIPTION OF THE DRAWING

The invention will now be described in greater detail with reference to the drawing which is a diagrammatic view showing the injection unit in a position which it assumes directly after termination of the injection operation.

DETAILED DESCRIPTION OF THE DRAWING

The cylinders 3 are laterally secured by way of carrier flanges 4 laterally onto the mould carrier plate 5. Slidably disposed in the cylinders 3 are pistons 18 which are secured to the end faces of respective bar members 1 which carry the entire injection unit. The pistons 18 can be subjected to pressure on either face. The material cylinder 22 is carried by a bridge 33 which in turn is supported by the bar members 1, the bridge 33 being secured in position relative to the bar members 1 by means of nuts 2. Further pistons 30 are secured to the second end faces of the respective bar members 1. The pistons 30 are slidably disposed in cylinders 10 which are connected by way of a bridge 29 to the actuating means 9' for the screw 9 which is disposed in the cylinder 22 so as to be rotatable and axially displaceable therein. The cylinders 3 and 10 are respectively sealed relative to the bar members 1 by dynamic sealing means 8, thus providing for maintenance-free guidance which does not require any additional lubrication. An advantage of the injection unit according to the invention is that the whole unit can be supported by the cylinders 3 in a freely overhung position.

If pressure is applied in line 7 and line 6 is connected to the tank, the cylinder chamber 32 is increased in volume, and the bar members 1 are moved towards the mould carrier plate 5 and press the cylinder 22 against the mould. If on the other hand pressure is applied in the line 6 and the line 7 is connected to the tank, the cylinder chamber 31 increases in volume and the cylinder 22 is moved away from the mould.

By applying pressure in the line 21, the hydraulic motor 19 is set in rotation and drives the screw 9. The plasticised material in the cylinder 22 is conveyed in the direction towards the nozzle mouth of the cylinder, due to the rotation of the screw 9, and the material to be injection moulded is metered out. The pressure acting on the end face of the screw 9 while this occurs presses the screw out of the cylinder 22, which causes the cylinder chambers 26 to be reduced in volume. The hydraulic oil contained in the chambers 26 flows away into the tank line 25 by way of adjustable restrictor non-return valves 17 and 16 and the control slide valve 13 which is in the position $P_1$. At the same time the hydraulic oil which is discharging from the motor 19 flows away by way of a non-return valve 23, a part of this oil flow filling the cylinder chambers 27 of the cylinders 10, which cylinder chambers increase in volume during the material metering operation effected by the screw 9. The remainder of the oil flowing from the motor 19 flows by way of a restrictor 24 and the control slide valve 13 which is in the position $P_1$, into the tank. The oil flowing away through the restrictor 24 is subjected to an increase in pressure due to the action of the restrictor 24, and a corresponding increase in pressure occurs in the cylinder chambers 27. This increase in pressure causes a reduction in the metering pressure which is determined by the adjustable restrictor non-return valve 17. This pressure fluid action in the cylinder chambers 27 makes it possible, even when the injection device is arranged vertically, to set the metering pressure at a value below that value which is determined by the weight of the screw 9, the screw actuating means 9', the bridge 29 and the cylinders 10. When the unit is arranged horizontally, the reduction in metering pressure which is caused by the cylinder chambers 27 being subjected to the pressure fluid as referred to above can be compensated for, by suitable adjustment of the restrictor non-return valve 17. To terminate the metering operation, the supply of pressure oil to the hydraulic motor 19 is interrupted. Thereupon the cylinder 22 is pressed against the mould and pressure oil is applied to the line 15 so that pressure oil passes into and causes an increase in the volume of the cylinder chambers 26 of the cylinders 10, the pressure oil flowing by way of the control slide valve 13 which is in the position $P_1$, and the two adjustable restrictor non-return valves 16 and 17. As the piston 30 which delimites the cylinder chamber 26 is stationary, the cylinder 10 is moved beyond the piston 30 so that, when the cylinder chamber 26 is subjected to pressure, the cylinder 10 and thus also the screw 9 move towards the mould. This causes the cylinder chamber 27 to be reduced in volume and the oil contained therein flows away by way of the restrictor 24 into the tank line 25.

For the purposes of repair or maintenance operations, the control slide valve can be moved into the position $P_2$ and pressure applied in the line 15. When this is done pressure oil passes into the cylinder chambers 27 and the screw 9 is drawn out of the cylinder 22, even if there is no plasticised material in the cylinder.

With the injection unit according to the invention, it is possible for the pressure lines for supplying the pressing cylinders 3 to be of a rigid construction, while relatively short hose lines 20 have only to be provided in the supply lines 21, 24 and 12 to the hydraulic motor 19 and to the movable cylinders 10 respectively.

I claim:

1. An injection unit for an injection moulding machine, in particular for processing thermoplastic materials, said unit comprising:
   a rotatable screw which is disposed in an axially displaceable material cylinder and which is axially displaceable relative to said cylinder;
   respective separate hydraulic cylinders for separately moving said cylinder and screw;
   said cylinder being fixedly connected to bar members which are displaceable by first hydraulically actuated pistons operable within said hydraulic cylinders of said cylinder; and
   said bar members having thereon second pistons which are slidable within said cylinders of said screw, said cylinders of said screw being operatively connected to said screw.

2. An injection unit as claimed in claim 1, wherein both said first pistons for displacing said bar members and said second pistons for displacing said screw are double-acting pistons.

3. An injection unit as claimed in claim 1, further comprising screw actuating means connected to said screw and comprising a hydraulic motor having a return line connected to cylinder chambers of said cylinders of said screw which are remote from said bar members; a bridge connected to said hydraulic motor and to said cylinders of said screw; and a restrictor provided directly upstream of the opening of said return line into storage tank line.

* * * * *